United States Patent [19]
Kalsi

[11] Patent Number: 5,448,213
[45] Date of Patent: Sep. 5, 1995

[54] ELECTROMAGNETIC SHIELDING CONCEPT FOR SUPERCONDUCTING LEVITATING MAGNETS

[75] Inventor: Swarn S. Kalsi, Ft. Salonga, N.Y.

[73] Assignee: Northrup Grumman Corporation, Los Angeles, Calif.

[21] Appl. No.: 308,198

[22] Filed: Sep. 19, 1994

Related U.S. Application Data

[63] Continuation of Ser. No. 121,412, Sep. 16, 1993, abandoned.

[51] Int. Cl.⁶ .................. H01F 1/00; H01F 7/00; H01F 3/00; B60L 13/02
[52] U.S. Cl. .................. 335/216; 104/285; 104/286; 335/301; 335/297; 310/14
[58] Field of Search ............ 104/281, 282, 283, 284, 104/285, 286; 335/216, 297, 301; 310/12, 13, 14

[56] References Cited

FOREIGN PATENT DOCUMENTS

| | | | |
|---|---|---|---|
| 0152212 | 11/1981 | Japan | 505/879 |
| 0165901 | 7/1987 | Japan | 335/216 |
| 0074708 | 3/1989 | Japan | 335/216 |
| 0115107 | 5/1989 | Japan | 335/216 |
| 0187606 | 8/1989 | Japan | 335/216 |
| 0017806 | 1/1990 | Japan | 104/281 |

*Primary Examiner*—Leo P. Picard
*Assistant Examiner*—Stephen T. Ryan
*Attorney, Agent, or Firm*—Terry J. Anderson; Karl J. Hoch, Jr.

[57] ABSTRACT

A superconducting magnet for a MAGLEV vehicle has flux perturbation shielding rings mounted to the core common with superconducting magnetic coils. These rings resist rapid flux perturbations occurring in the superconducting magnet as a result of normal operational transients. The rings are, in effect, short-circuited coils fabricated from metal. One or more sets of these shielding rings may be employed along the length of the core for achieving flux regulation.

3 Claims, 3 Drawing Sheets

5,448,213

ELECTROMAGNETIC SHIELDING CONCEPT FOR SUPERCONDUCTING LEVITATING MAGNETS

This application is a continuation of U.S. patent application Ser. No. 08/121,412, filed Sep. 16, 1993 now abandoned.

FIELD OF THE INVENTION

The present invention relates to superconducting magnets, and more particularly to a superconducting magnet assembly for use with a magnetically levitated (MAGLEV) vehicle.

BACKGROUND OF THE INVENTION

A magnetically levitated (MAGLEV) vehicle may utilize iron core superconducting magnets to achieve vehicle levitation. The magnet iron core may be C-shaped with a superconducting coil on each leg (or a single superconducting coil on the bight of the core. When the superconducting magnet is energized, each leg of the C-shaped core is attracted to an iron rail that is attached to a MAGLEV track. If the superconducting magnet is designed to run in a persistent current mode, the magnet will maintain its electrical current at a given value for an indefinite period of time. A superconducting persistent magnet must be shielded from any fast flux perturbations. Otherwise, these flux perturbations could generate excessive heating in the magnet conductor and its structure and thus might degrade its persistent electrical current quality—or in extreme cases might cause the superconducting magnet to change to the normal resistive state. On the other hand, if the magnet is operated in a DC mode, even then it must be protected from rapid flux perturbations. These flux perturbations could be caused by electrically generated harmonics in the linear traction windings embedded within the rail of a MAGLEV vehicle, or by movement of the C-shaped core with respect to the rail in a direction perpendicular to the rail length.

BRIEF DESCRIPTION OF THE PRESENT INVENTION

The present invention is directed to an improvement of present superconducting magnet assemblies for MAGLEV vehicles. Specifically, the invention is related to the addition of shorted rings or coils, herein referred to as shielding coils, which are mounted on the same core as the superconducting magnets and which regulate changes of flux flowing through the core. Utilization of such rings protect the superconducting magnet against the undesirable rapid flux perturbations discussed above. The shorted rings slow down the flux changes to a rate which could be tolerated by the superconducting magnet. This perturbation shielding concept is passive and does not require mechanical or electrical controls to perform its function.

BRIEF DESCRIPTION OF THE FIGURES

The above-mentioned objects and advantages of the present invention will be more clearly understood when considered in conjunction with the accompanying drawings, in which.

DETAILED DESCRIPTION OF THE INVENTION

Figure 1:
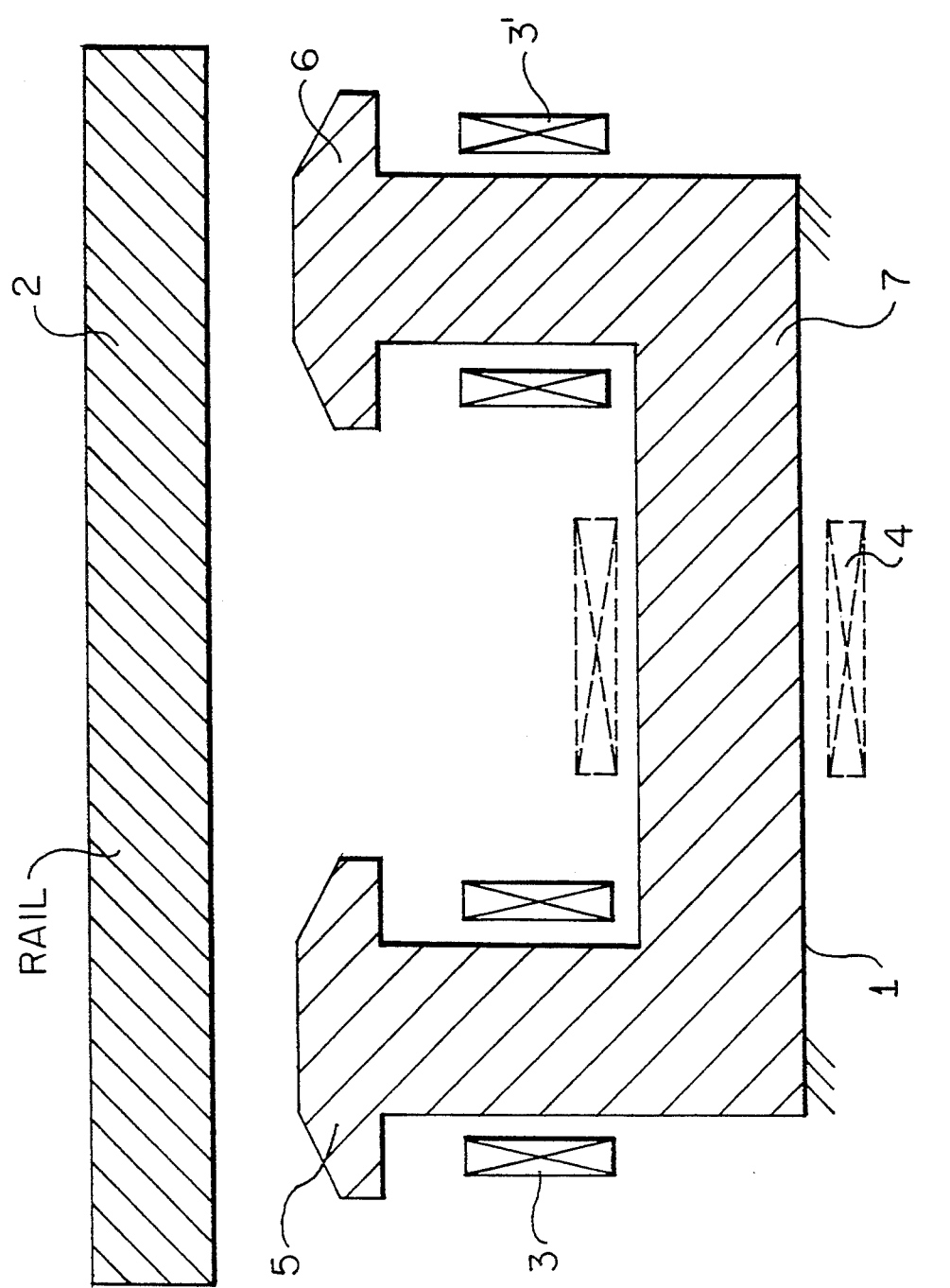
FIG. 1 is a cross-sectional view of a prior art two-pole C-shaped core superconducting magnet in relationship to a vehicle reaction rail.

FIG. 1 illustrates a C-shaped magnet 1 relative to a MAGLEV rail 2. The magnet is attached to a MAGLEV vehicle (not shown). When the magnet is energized by superconducting coils 3 and 3', an attractive force is developed between the two magnetic poles 5 and 6 and the rail 2 which is mounted on tracks (not shown). The magnet particularly comprises an iron core 7 which serves as a conduit for flux flow between the two poles 5 and 6 via the gaps between the poles and the rail 2. This iron core may be made from a solid magnetic steel material or can be constructed from thin laminations to suit a given application. It is also possible to achieve the same effect by using a single superconducting coil 4, shown on the bight of the core in phantom lines, instead of the two coils 3 and 3'. A levitation effect can also be achieved by employing a pole structure for the core in excess of two poles. The structure thus far described constitutes prior art and suffers the problems of perturbations as discussed above.

Figure 2:
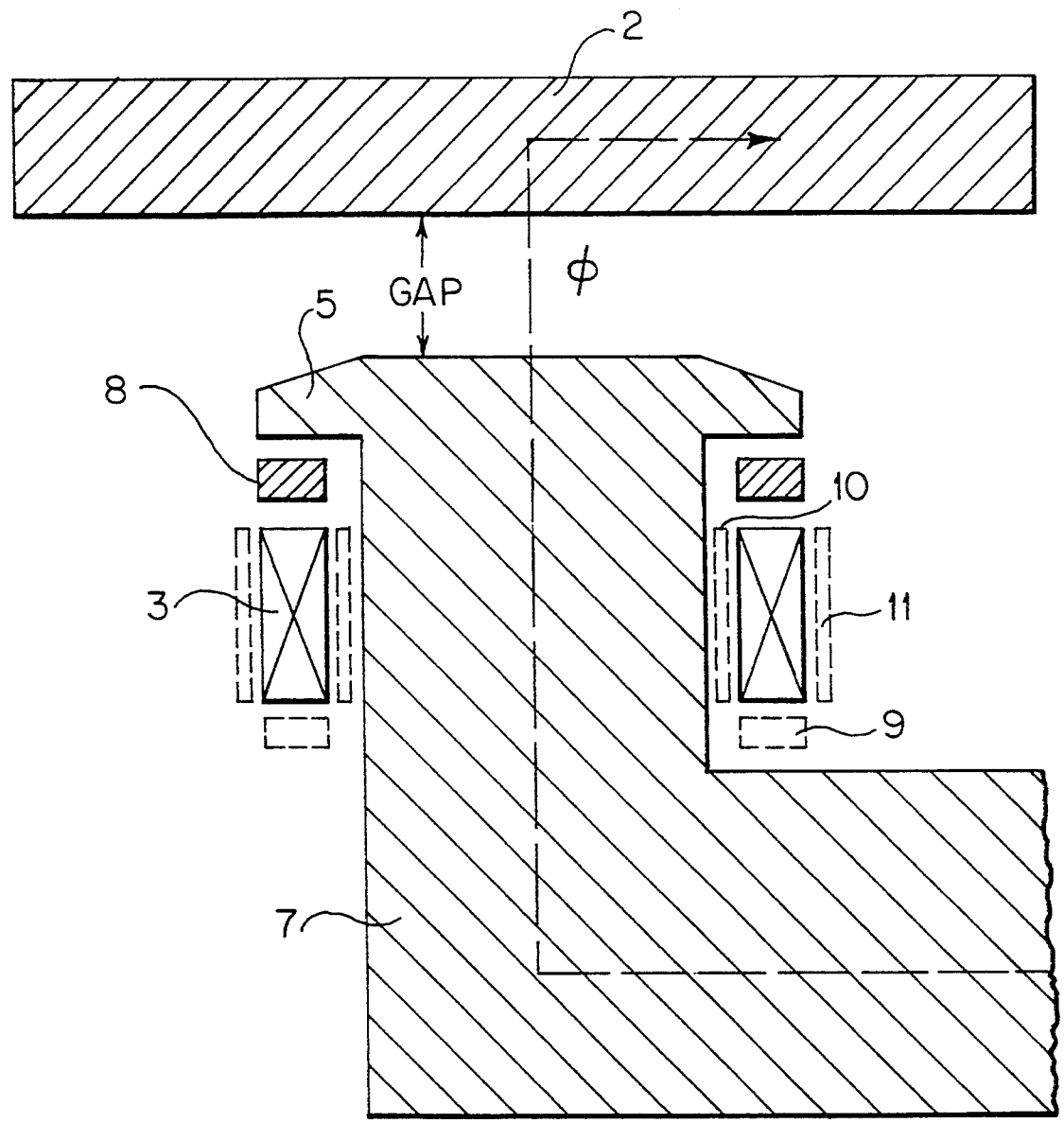
FIG. 2 is a partial sectional view, similar to that of FIG. 1, but illustrating the inclusion of shielding rings relative to the core.

FIG. 2 indicates an enlarged view of the pole 5, relative to rail 2, this figure illustrating the inclusion of shielding rings in accordance with the present invention. In FIG. 2, the pole 5 is shown adjacent rail 2, with the gap therebetween being indicated. The iron core 7 extends through superconducting coil 3. The magnet pole 5 is shaped to produce a desired magnetic field distribution at the surface of the rail. During normal operation, the superconducting coil 3 operates in a persistent or direct current mode. The persistent current mode is achieved by charging the superconducting magnet to a desired current level and then shorting its terminals. Since the superconducting coil has almost zero resistance, the current flows indefinitely. However, in a normal superconducting magnet assembly, as discussed in connection with FIG. 1 and the prior art, flux perturbations occur because the gap between the pole and the rail changes. Some of the events causing or contributing to the gap variations are:

uneven vehicle track produces a variation of the gap length between rail 2 and magnet poles 5 and 6;

roll of the car body due to side wind loading;

variation of the gap length between the rail and poles over a curved portion of the vehicle track; and oscillations generated by the mechanical suspension systems of the car.

In addition to these factors, a higher order harmonics generated by the traction winding (not shown) embedded in rail 2 also produces flux changes relative to the superconducting coil. If the superconducting magnet is subjected to such external flux perturbations, it tends to alter the superconducting coil current and generate a sufficient amount of hysteresis and eddy current losses in the coil winding. If these losses are not controlled, they can force the coil to lose its persistent current property or, in a worst case scenario, could cause it to change to the normal resistive state.

The present invention shields the superconducting coil 3 from the externally imposed flux perturbations by incorporating a flux perturbation shielding ring 8 around the leg of the core 7. The ring is made from a low resistivity metal (e.g., copper, aluminum, etc.) and can be suitably sized to exclude flux changes of a given frequency.

The shielding ring 8 may be replaced or augmented by additional shielding rings as indicated by reference numerals 9, 10, and 11 (in phantom lines) at different points along the leg of core 7. The operation of the shielding rings will now be explained.

Figure 3:
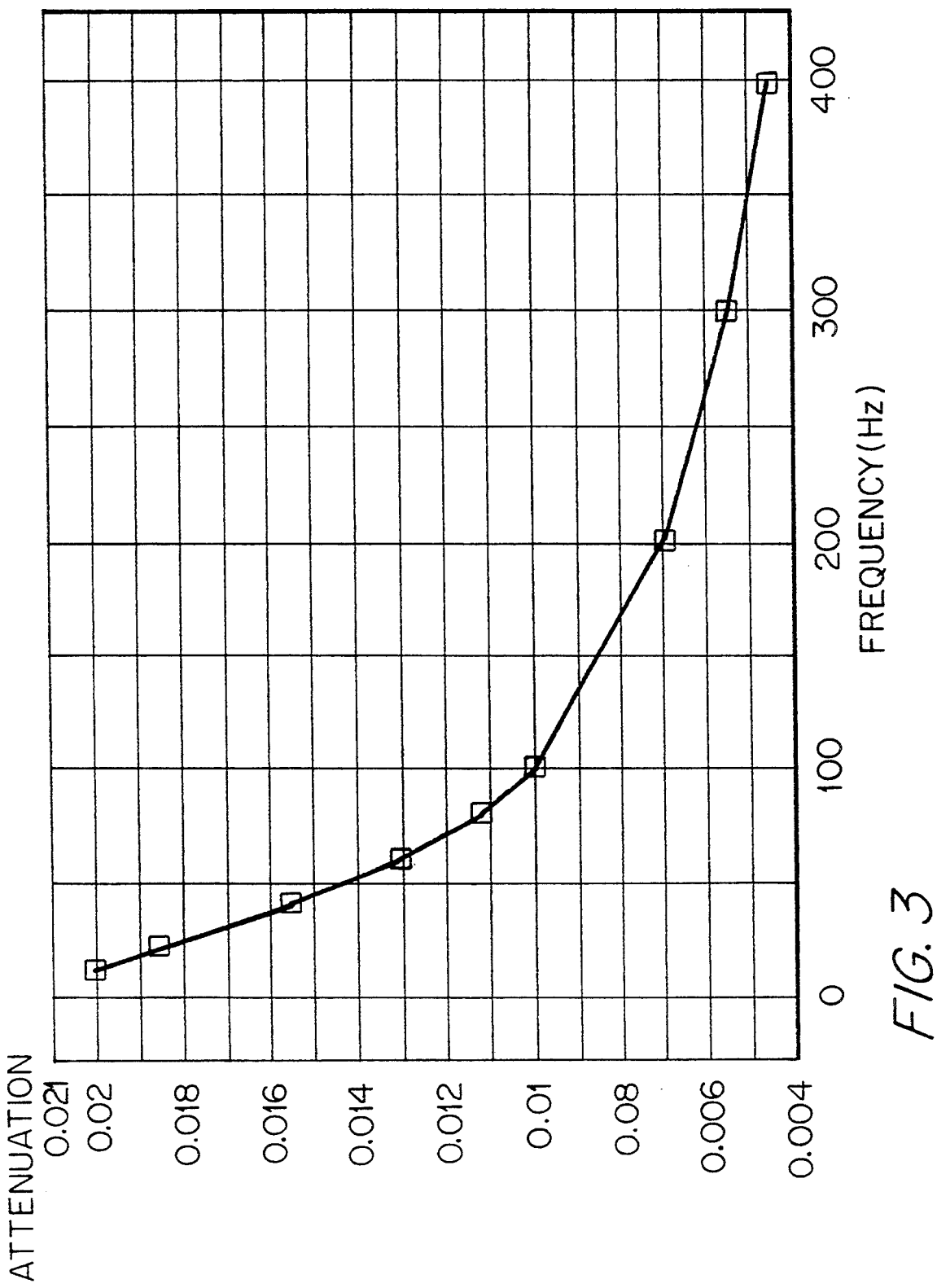
FIG. 3 is a plot of flux perturbation attenuation as a function of frequency.

When external flux perturbations are imposed on the magnet, shielding rings develop reaction current to maintain the flux passing through the rings and to exclude the externally imposed flux changes. The shielding can be designed to exclude flux changes for a particular frequency spectrum. The shielding capability of ring 9 is indicated in the plot of FIG. 3 which indicates the shielding effectiveness (i.e. attenuation of externally imposed flux perturbations) as a function of frequency.

The electromagnetic shielding rings can be designed to exclude flux changes caused by the events outlined above. The rings are designed to exclude flux changes above a certain cut-off frequency. However, if the changes are below this cut-off frequency, the flux penetrates the ring. This flux penetration feature is used for altering the persistent current level in the superconducting coil 3 to provide stable operation consistent with vehicle load.

The electromagnetic shielding also acts as a magnetic shock absorber by smoothing out vertical bumps (over a short period of time) during a vehicle ride. When the gap between the pole and the rail shortens, the flux tends to increase in the pole. The shielding ring attempts to maintain flux through the ring by generating currents in itself. This decreases the air gap flux and therefore reduces the attraction force between the pole and the rail. On the other hand, if the gap increases, then the ring develops self currents to increase the gap flux which in turn increases the attractive force. This way, the ring provides a self-regulating attractive force control. The electromagnetic attractive force control feature also works even when the coil is a normal resistive coil. The coil current must be adjusted if there is a steady increase or decrease in the vehicle load.

Although this discussion is directed to iron cored magnets, the electromagnet shielding concept can be applied with equal effectiveness to air-cored magnets with no iron. In some applications of a MAGLEV vehicle, the iron rail is also replaced with magnet coils. In such cases, the levitation is achieved by repulsive force between the coils on the car and the coils in the track. The magnet coils in the track can be normal or superconducting. The electromagnetic shielding concept discussed herein can be used to shield both sets of coils, i.e. coils on the car and coils on the track.

Another location for the shielding rings could be the surface of the pole 5 facing the gap (not shown) but configurational constraints of the MAGLEV system may disallow this location. It is to be noted that individual shielding rings can be made from a single material or from a combination of materials to meet a desired flux exclusion criteria. From the discussion above, it can be appreciated that the utilization of the shielding rings substantially improves the efficiency and comfort level of a MAGLEV vehicle.

It should be understood that the invention is not limited to the exact details of construction shown and described herein for obvious modifications will occur to persons skilled in the art.

I claim:

1. A magnet assembly for a MAGLEV vehicle guided along a rail, the assembly comprising:
    a magnet core mounted to the vehicle and having a plurality of poles located in spaced relationship to the rail;
    at least one superconducting coil mounted to the core and carrying current for providing steady state flux in a gap between the poles and the rail for levitating the vehicle; and
    at least one single solid shorted metal conductor ring means, mounted adjacent the coil and encircling the core, through which the flux passes, for regulating transient changes in the flux, below a cut-off frequency, passing through the gap;
    the ring means further having
        (a) a solid, unitary, non-spiral body; and
        (b) transverse annular planar ends.
2. The assembly set forth in claim 1 wherein a coil encircles each pole of the core.
3. The assembly set forth in claim 1 wherein a coil encircles a bight section of the core.

* * * * *